United States Patent [19]
Armstrong et al.

[11] 3,789,880
[45] Feb. 5, 1974

[54] POROUS METAL FLOW CONTROL SPOOL
[75] Inventors: Dan F. Armstrong; George F. Armstrong, both of Saint Albans, W. Va.
[73] Assignee: Chem Valley Machines, Inc., St. Albans, W. Va.
[22] Filed: Jan. 4, 1972
[21] Appl. No.: 215,318

[52] U.S. Cl............ 137/625.3, 137/625.38, 138/42, 138/44
[51] Int. Cl. ....... F16k 3/32, F16k 47/14, F15d 1/10
[58] Field of Search..... 137/625.38, 625.68, 625.28, 137/625.3, 625.33, 625.35, 625.37; 251/118; 138/42, 44, 40

[56] References Cited
UNITED STATES PATENTS
3,167,632  1/1965  O'Conner................. 137/625.64 X
3,029,830  4/1962  Klover et al. .............. 137/625.62 X
2,517,061  8/1950  Von Stackelberg ....... 137/625.25 X FOREIGN PATENTS OR APPLICATIONS
567,044  1/1945  Great Britain........................ 138/42

Primary Examiner—Arnold Rosenthal
Attorney, Agent, or Firm—Clarence A. O'Brien; Harvey B. Jacobson

[57] ABSTRACT
A flow control spool having first, second, and third separate cylindrical spool parts, and a pair of porous metal discs arranged in the second spool part for controlling the flow in a flow path defined by the spool. The spool parts are hollow with an end of the first and third spool parts being enclosed, and each spool part is provided with ports which cooperate with passages in a valve block in which the spool is arranged for defining a flow path system.

8 Claims, 6 Drawing Figures

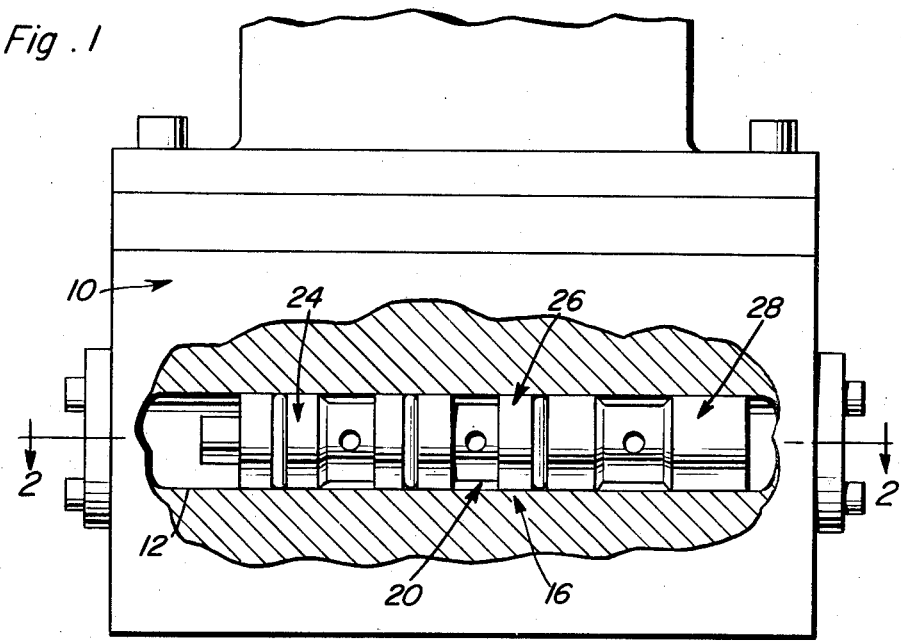
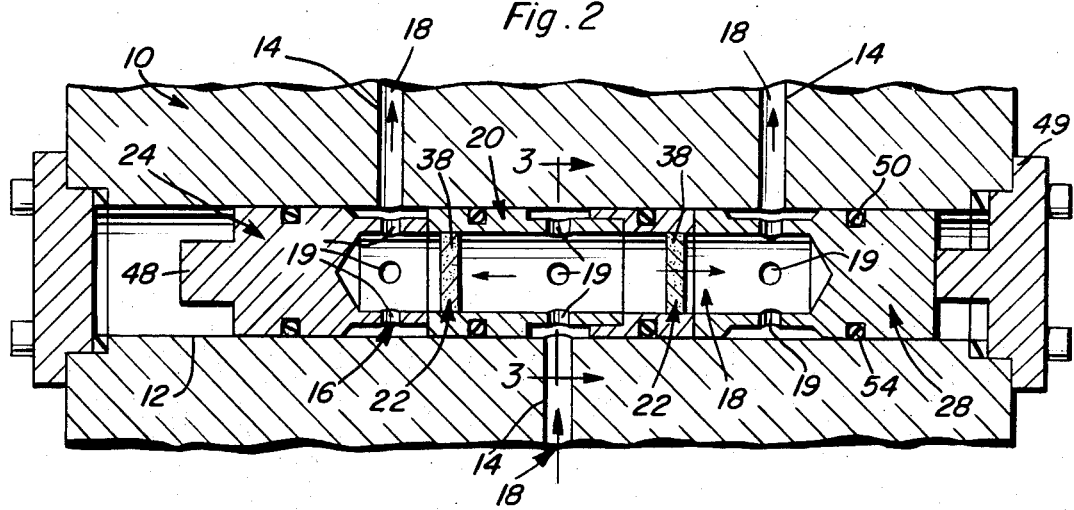
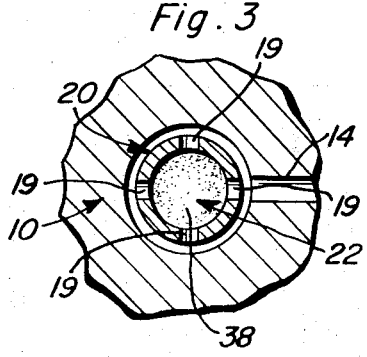

POROUS METAL FLOW CONTROL SPOOL

BACKGROUND OF THE INVENTION

1. Field of the Invention

This invention relates to a flow control spool, and specifically to such a spool using at least one porous metal disc to control the flow.

2. Description of the Prior Art

It is known to use a flow control spool in, for example, a blow-back block assembly to provide a specified flow of purging materials passed therethrough. In such a spool used previously, the flow is controlled by a coil of capillary tubing which acts as an orifice and is wrapped around the exterior of a one-piece cylindrical spool. Inherent to any orifice-type construction, however, is that the orifice is easily blocked by foreign material. Furthermore, with the known spools, when it is necessary to replace the flow control element, the entire spool must be discarded and a new one substituted therefor.

It is also known to manufacture porous metal in many different forms, but it is primarily used for filtering and/or cleaning.

SUMMARY OF THE INVENTION

It is an object of the present invention to provide a flow control spool which will give substantially longer service than known spools. It is yet another object of the present invention to provide such a spool which will not require discarding the entire spool when the service life of the flow control element has expired.

These and other objects are achieved according to the present invention by providing a flow control spool having at least one spool part defining a flow path, and porous means arranged in the flow path for controlling the amount of flow therein. The spool according to the present invention additionally is made up of first, second, and third separate spool parts, with the porous means arranged in the second spool part.

In a preferred embodiment of the present invention, the second spool part is a hollow cylinder provided with spaced, open ends and at least one port arranged between the ends. The porous means is at least one porous metal disc. Advantageously, there are a pair of porous metal discs, one arranged between the port and a respective end.

The first and third spool parts may also be hollow cylinders. Each of these hollow cylinders is provided with an open end arranged adjacent a respective end of said second spool part, an enclosed end, and at least one port arranged between the ends. The ports and hollow cylinders define a flow path system.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view, partly cut away, showing a flow control spool according to the present invention arranged in a valve block.

FIG. 2 is a fragmentary sectional view taken generally along the line 2—2 of FIG. 1.

FIG. 3 is a fragmentary sectional view taken generally along the line 3—3 of FIG. 2.

FIG. 5 is a perspective view showing a part of the flow control spool of FIG. 4.

DESCRIPTION OF THE PREFERRED EMBODIMENT

Figure 4:
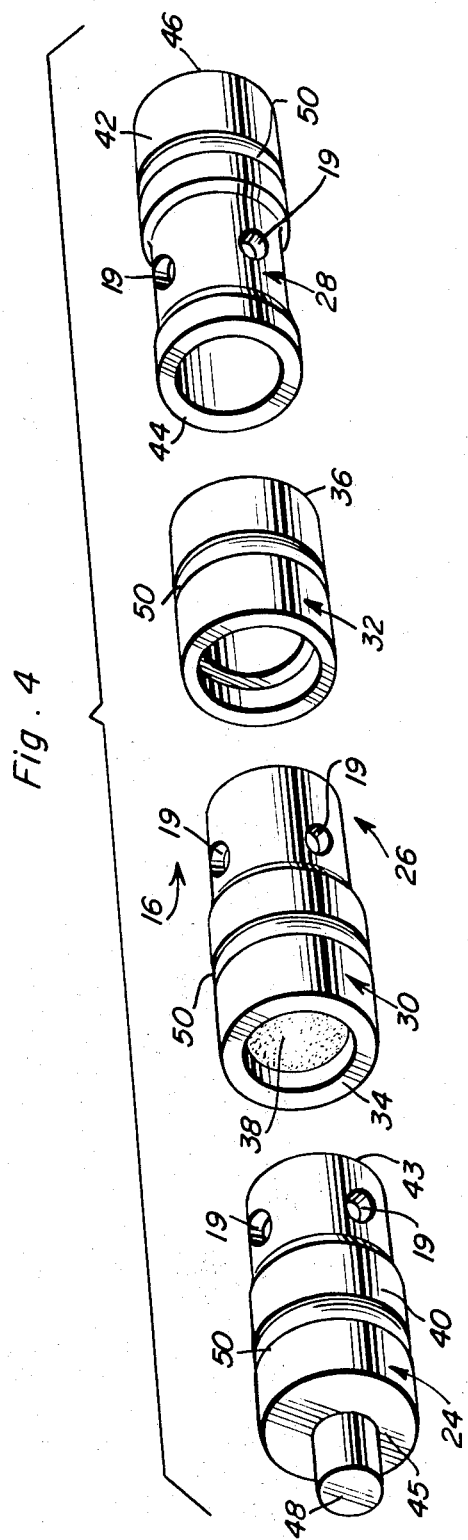
FIG. 4 is an exploded perspective view showing a flow control spool according to the present invention.

Referring first to FIGS. 1 to 3 of the drawings, a valve block 10 known per se is provided with a bore 12 and flow passages 14 communicating with bore 12. A flow control spool 16 is arranged in bore 12 and defines a flow path system 18 with flow passages 14. The flow arrows in FIG. 2 designate a possible flow path in spool 16. Ports 19 are provided in spool 16 for partially defining flow path system 18. Spool 16 has at least one spool part 20 defining a flow path designated by the flow arrows therein, and a porous means 22 arranged in the flow path for controlling the amount of flow therein.

Figure 6:
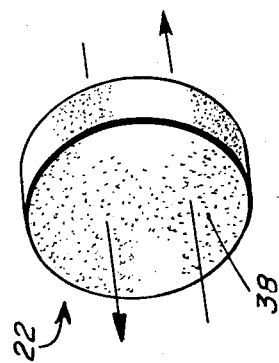
FIG. 6 is a perspective view showing a porous metal disc for use with a flow control spool according to the present invention.

Referring now to FIGS. 4 to 6 of the drawings, spool 16 is made out of a first spool part 24, a second spool part 26, and a third spool part 28. Spool parts 24, 26, and 28 are all separate elements. Porous means 20 is arranged in second spool part 26.

Second spool part 26 is preferably constructed in two pieces 30, 32. When pieces 30, 32 are connected together a hollow cylinder 33 is formed which is provided with spaced, open ends 34, 36 and at least one port 19. Four ports 19 are shown in the drawings. Porous means 20 has a pair of porous metal discs 38 arranged in hollow cylinder 33, one disc 38 between ports 19 and a respective end 34, 36.

Porous metal disc 38 may be constructed in a known manner, as by sintering, from a suitable material, such as a stainless steel. These discs 38 are pressed tightly into cylinder 33 so as to provide a flow of, for example, 0.4 cubic feet per minute. By proper dimensioning of disc 38 and cylinder 33, the proper pressure may be applied to disc 38 to provide a desired flow rate through spool parts 24, 26, and 28. Pieces 30, 32 are made separately in a known manner, tested separately, and then joined together by a press fit.

First and third spool parts 24, 28 are also in the form of hollow cylinders 40, 42, respectively. Each cylinder 40, 42 is provided with open ends 43, 44, respectively, arranged adjacent a respective end 34, 36 of spool part 26, and an enclosed end 45, 46. At least one port 19 is arranged between ends 43, 45, and 44, 46, respectively. Four such ports 19 for each part 24, 28 are shown in the drawings. An abutment 48 may be provided on end 45 of part 24 as is conventional with such spools. The travel of spool 16 must be limited in order to prevent its movement to one end of bore 12, which would render it inoperative. An alternative to abutment 48 is an abutment 49 (FIG. 2) in block 10.

Each piece 30, 32 of spool part 26, and each of spool parts 24, 28 is provided with a peripheral groove 50 for receiving a suitable, known sealing element 52 (FIG. 2). Element 52 may be a conventional neoprene O-ring. Sealing elements 52 permit sealed movement of spool 16 in bore 12.

Spool 16 according to the present invention has the advantage that the use of porous metal disc 38 to control the flow therein provides hundreds of tiny holes or pores which expose a much larger area of the flow on the inlet side of a disc 38. This means that the porous disc arrangement affords a much longer service life than an orifice-type arrangement. The increased life is estimated at 6 to 10 times that of the previously used capillary tubing. The reason for this is that the restricted exposed area of the tubing results in blockage thereof by foreign material. In addition, when discs 38 eventually do need replacing, only spool part 26 need be discarded and replaced. Spool parts 24 and 28 may be reused. This feature results in a substantial savings over the previously used one-piece spool. Spool 16, further, may be used with a previously employed blow-back block, resulting in further savings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A flow control spool, comprising, in combination, first, second and third separate spool parts defining a flow path, and porous means arranged in the flow path in the second spool part for controlling the amount of flow therein, said second spool part being a hollow cylinder constructed in two pieces and provided with spaced, opened ends and at least one port arranged between the ends, and said porous means being at least one porous metal disc arranged within said hollow cylinder, said first and third spool parts being also hollow cylinders, each provided with an open end arranged adjacent a respective end of said second spool part, an enclosed end, and at least one port arranged between the ends, said ports and hollow cylinders defining a flow path system.

2. A structure as defined in claim 1, wherein there are a pair of porous metal discs, one arranged between said port and a respective end.

3. A structure as defined in claim 1, wherein each said piece of said second spool part, and each of said first and third spool parts is provided with a groove for receiving a sealing element.

4. A flow control spool, comprising at least one spool part defining a flow path, and porous means arranged in the flow path for controlling the amount of flow therein, said spool part being a hollow cylinder provided with spaced, opened ends and at least one port arranged between the ends, and said porous means being at least one porous metal disc arranged within said hollow cylinder, the spool further comprising, in combination, first, second, and third separate spool parts, and said porous means being arranged in said second spool part, said first and third spool parts being also hollow cylinders, each provided with an open end arranged adjacent a respective end of said second spool part, an enclosed end, and at least one port arranged between the ends, said ports and hollow cylinders defining a flow path system.

5. In a combination of valve block provided with a bore and flow passages communicating therewith, and a flow control spool arranged in the bore and defining a flow path system with the flow passages, the improvement wherein the flow control spool has porous means arranged in the flow path for controlling the amount of flow therein, and the flow control spool in the operative mode thereof is divided into a plurality of unattached and abutting spool parts with the porous means being at least one porous metal disc arranged in one of the spool parts.

6. A structure as defined in claim 5, wherein the flow control spool in the operative mode thereof is divided into first, second, and third unattached and abutting spool parts, and the porous metal disc is arranged in the second spool part, the second spool part being arranged between the first and third spool parts.

7. A structure as defined in claim 6, wherein the second spool part is a hollow cylinder provided with spaced, opened ends and at least one part arranged between the ends.

8. A structure as defined in claim 7, wherein said second spool part is constructed in two pieces.

* * * * *